United States Patent
Ferro

(10) Patent No.: US 12,198,257 B2
(45) Date of Patent: Jan. 14, 2025

(54) SYSTEM AND METHOD OF PRODUCING A COMPUTER-GENERATED IMAGE OF A COMPONENT PART USING COMPUTED TOMOGRAPHY

(71) Applicant: General Electric Company, Schenectady, NY (US)

(72) Inventor: Andrew Frank Ferro, West Chester, OH (US)

(73) Assignee: General Electric Company, Evendale, OH (US)

( * ) Notice: Subject to any disclaimer, the term of this patent is extended or adjusted under 35 U.S.C. 154(b) by 322 days.

(21) Appl. No.: 17/896,267

(22) Filed: Aug. 26, 2022

(65) Prior Publication Data
US 2024/0070968 A1    Feb. 29, 2024

(51) Int. Cl.
G06T 15/08    (2011.01)
G06T 7/00    (2017.01)

(52) U.S. Cl.
CPC ............ G06T 15/08 (2013.01); G06T 7/0004 (2013.01); *G06T 2207/10081* (2013.01); *G06T 2207/30164* (2013.01)

(58) Field of Classification Search
None
See application file for complete search history.

(56) References Cited

U.S. PATENT DOCUMENTS

| 4,891,829 A | 1/1990 | Deckman et al. |
| 6,041,132 A | 3/2000 | Isaacs et al. |
| 6,163,589 A | 12/2000 | Vartanian |
| 6,879,656 B2 | 4/2005 | Cesmeli et al. |
| 6,922,457 B2 | 7/2005 | Nagata et al. |

(Continued)

FOREIGN PATENT DOCUMENTS

| CN | 1584568 A | 2/2005 |
| CN | 101095165 A | 12/2007 |

(Continued)

OTHER PUBLICATIONS

Hopkins et al., Analytical Corrections for Beam-Hardening and Object Scatter in Volumetric Computed Tomography Systems, 16th World Conference of Nondestructive Testing, Montreal Canada, Sep. 1, 2004, 7 Pages.

(Continued)

*Primary Examiner* — Saptarshi Mazumder
(74) *Attorney, Agent, or Firm* — McGarry Bair PC

(57) ABSTRACT

A method of producing a computer-generated image of a component part includes receiving scan data of the component part. The scan data includes a plurality of slices that change direction about a normal vector. The method further includes registering the scan data of the component part and transforming the scan data of the component part into a set of slices arranged in an x-y plane. Further, the method includes aligning the set of slices aligned along the axis along an axis in the x-y plane. In addition, the method includes adjusting the set of slices aligned along the axis using a background model for the component part, the scan data, or both. Thus, the method includes applying a directional filter to the set of slices aligned along the axis and generating the computer-generated image of the component part using the filtered set of slices aligned along the axis.

20 Claims, 6 Drawing Sheets

(56) References Cited

U.S. PATENT DOCUMENTS

| | | | |
|---|---|---|---|
| 7,227,923 | B2 | 6/2007 | Edic et al. |
| 7,549,789 | B2 | 6/2009 | Tralshawala et al. |
| 7,889,833 | B2 | 2/2011 | Hagiwara |
| 7,894,567 | B2 | 2/2011 | Hagiwara |
| 7,933,441 | B2 | 4/2011 | Numata et al. |
| 8,418,560 | B2 | 4/2013 | Faidi et al. |
| 8,442,301 | B2 | 5/2013 | Dragovich et al. |
| 8,826,740 | B2 | 9/2014 | Bergman |
| 9,002,088 | B2 | 4/2015 | Ferguson |
| 9,052,294 | B2 | 6/2015 | Walton |
| 9,585,636 | B2 | 3/2017 | Osumi et al. |
| 9,595,092 | B2 | 3/2017 | Wu et al. |
| 9,746,405 | B2 | 8/2017 | Monaghan et al. |
| 9,976,964 | B2 | 5/2018 | Fisset et al. |
| 10,203,290 | B2 | 2/2019 | Ferro et al. |
| 10,481,108 | B2 | 11/2019 | Ferro et al. |
| 10,803,673 | B2 | 10/2020 | Morard et al. |
| 11,060,986 | B2 | 7/2021 | Somanou et al. |
| 2006/0093082 | A1 | 5/2006 | Numata et al. |
| 2009/0097778 | A1* | 4/2009 | Washburn ............... A61B 90/36 382/294 |
| 2009/0279772 | A1 | 11/2009 | Sun et al. |
| 2010/0140485 | A1 | 6/2010 | Mishra et al. |
| 2010/0208964 | A1 | 8/2010 | Wiegert et al. |
| 2010/0278440 | A1 | 11/2010 | Dragovich et al. |
| 2013/0165788 | A1 | 6/2013 | Osumi et al. |
| 2016/0305895 | A1 | 10/2016 | Ferro |
| 2018/0120268 | A1 | 5/2018 | Georgeson et al. |
| 2019/0086654 | A1* | 3/2019 | Huang ................... B01L 3/5027 |
| 2019/0353599 | A1 | 11/2019 | Zivkovic |
| 2020/0286211 | A1* | 9/2020 | Manhart ................... G06T 5/70 |
| 2020/0331206 | A1 | 10/2020 | Morovic et al. |

FOREIGN PATENT DOCUMENTS

| | | | |
|---|---|---|---|
| CN | 110674589 | A | 1/2020 |
| CN | 111272625 | A | 6/2020 |
| DE | 102013104720 | A1 | 11/2013 |
| EP | 1421559 | B1 | 3/2006 |
| JP | S6367551 | A | 3/1988 |
| JP | S63243852 | A | 10/1988 |
| JP | H08140964 | A | 6/1996 |
| JP | H11296700 | A | 10/1999 |
| JP | 2004062777 | A | 2/2004 |
| JP | 2005056087 | A | 3/2005 |
| JP | 2006266754 | A | 10/2006 |
| JP | 2006329917 | A | 12/2006 |
| JP | 2009034478 | A | 2/2009 |
| JP | 2010038878 | A | 2/2010 |
| JP | 2010057572 | A | 3/2010 |
| JP | 2010201089 | A | 9/2010 |
| WO | WO2018/022000 | A1 | 2/2018 |
| WO | WO2018/104683 | A1 | 6/2018 |

OTHER PUBLICATIONS

Huang et al., Visualizing Industrial CT Volume Data for Nondestructive Testing Applications, Annual IEEE Conference on Visualization, 2003, pp. 547-554.

Seitel et al., Adaptive Bilateral Filter for Image Denoising and its Application to In-Vitro Time-of-Flight Data, Medical Imaging 2011: Visualization, Image-Guided Procedures, and Modeling, vol. 7964, Mar. 2011. (Abstract Only).

Barisin Tin et al: "Adaptive Morphological Framework for 3D Directional Filtering", Image Analysis and Stereology, vol. 41, No. 1, 8 April 202, XP093118377, SI ISSN: 1580-3139, DOI: 10.5566/ias.2639 Retrieved from the Internet: URL:https://www.ias-iss.org/ojs/IAS/article/viewFile/2639/1160> Apr. 8, 2022.

Meetham et al: "The future of composites in gas turbine engines", Materials and Design, London, GB, vol. 10, No. 5, Sep. 1, 1989 (Sep. 1, 1989), pp. 231-234, XP022290996, ISSN: 0261-3069, DOI: 10.1016/S0261-3069(89)80059-7 Sep. 1, 1989.

* cited by examiner

SYSTEM AND METHOD OF PRODUCING A COMPUTER-GENERATED IMAGE OF A COMPONENT PART USING COMPUTED TOMOGRAPHY

FIELD

The present disclosure relates to a non-destructive method and system of producing a computer-generated image of a component part, such as of a composite part for a gas turbine engine, using computed tomography.

BACKGROUND

Industrial inspection is increasingly being performed using three-dimensional (3D) volumes. A volumetric computed tomography (VCT) scan may be performed, e.g., on a composite aircraft part under inspection, to generate a 3D stack, or "volume," of two-dimensional (2D) images, or "slices," of the part. A human operator then may individually review each 2D slice to identify an indication of defects typically found in composite parts, such as wrinkles.

BRIEF DESCRIPTION OF THE DRAWINGS

A full and enabling disclosure of the preferred embodiments, including the best mode thereof, directed to one of ordinary skill in the art, is set forth in the specification, which makes reference to the appended figures, in which.

DETAILED DESCRIPTION

Figure 1:
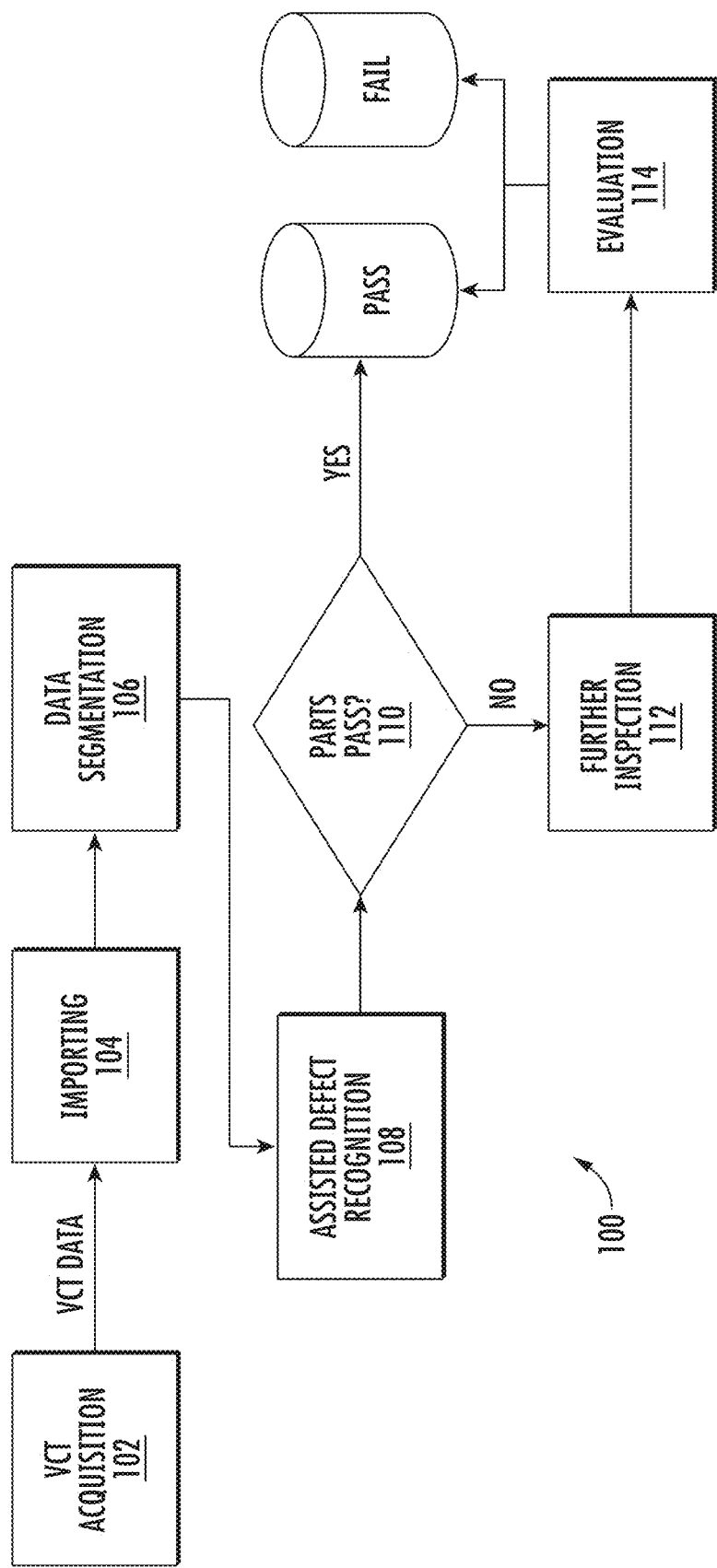
FIG. 1 is a flow chart showing operations of a VCT-based method for notifying an operator of an indication of a potential defect in a part, in accordance with various embodiments.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the preferred embodiments.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As mentioned, VCT scans may be performed, e.g., on a composite aircraft part under inspection, to generate a 3D stack, or "volume," of two-dimensional (2D) images, or "slices," of the part. Human operators then review each 2D slice to identify an indication of defects typically found in composite parts, such as wrinkles.

Slice-by-slice 2D inspection of a 3D model can be time consuming, laborious and/or error prone. In particular, operators may be required to review a large number of 2D slices of the 3D volume, alone and in relation to each other, in order to determine whether there are defects in the entire volume. For example, an operator may be required to observe subtle changes in grayscale occurring over multiple 2D images. It is also likely that the analysis will vary greatly across operators, as well as between stages of an operator's shift, e.g., due to operator fatigue.

Previous attempts to automate aspects of defect detection have had various problems. For instance, to reduce beam hardening and scattering artifacts, pixels, or voxels of a 3D volume of a part have been "normalized" to a "standard," e.g., an aluminum rod. However, adding a rod to the field of view may degrade the images, and this approach only works with linear computed tomography (CT) scans, not VCT. Moreover, this approach requires little or no geometric variance between the shape of the part and the shape of the standard.

Furthermore, 3D CT datasets are very large and images generated by CT processes from composites oftentimes do not resolve ply level detail, especially in braided composite materials. As such, an automated or partially automated system and method is needed to enhance the ply structure in CT imaging such that defects (e.g., out-of-plane wrinkles) can be detected.

Thus, the enhanced images facilitate review of the part by making the amount of data manageable. By automating the process to enhance such plies (whose cross-section is primarily in a single plane), defects in the part, such as wrinkles, may be detected in images that would otherwise show no to little ply information. Moreover, the component part may have spatially nonstationary, complex features in the plane of the plies, such as ply drops and geometry changes.

Accordingly, the present disclosure is generally related to a system and method for generating enhanced CT images that more accurately depict the architecture of a component part. In an embodiment, for example, the method includes aligning the component data such that all ply cross-sections are primarily in an x-y plane. Further, the method includes unwrapping a surface gradient of the component data. Thereafter, the method includes resampling the volume to the new grid. Moreover, the method includes computing and removing a background model so as to remove CT artifacts and enhance nonuniformity. Further, the method includes aligning/filtering the data/slices in the direction of the plies to enhance the ply structure without blurring in the cross-ply direction. The resulting image can be presented to an operator for evaluation, such as determining the presence of wrinkles.

Referring now to the drawings, wherein identical numerals indicate the same elements throughout the figures, FIG. 1 schematically depicts, at a relatively high level, an example CT-based method 100 for notifying a user of an indication of a potential defect in a part. In particular, for the embodiment shown, the method 100 is a VCT-based method 100. Various aspects of the method 100 will be depicted and described herein in more detail below.

At block 102, VCT data may be obtained, e.g., by feeding one or more parts through a VCT scanning system. The VCT scanning system may be any suitable VCT scanning system. For example, the VCT scanning system may utilize x-ray sources, x-ray tubes, x-ray detectors, etc. to generate a three-dimensional image of a part. For example, the VCT scanning system may use a fan beam x-ray source, which may be detected by a linear detector array, as the part is rotated relative to the x-ray source and detector array. Alternatively, the VCT scanning system may use a cone beam x-ray source, which may be detected by an area detector array, as the part is rotated relative to the x-ray source and detector array. With such configuration, the three-dimensional image may be formed of a plurality of two-dimensional images/slices of the part.

Alternatively, however, the method 100 may be a two-dimensional CT method, such that the method 100 may receive CT data including two-dimensional image(s) of the part at block 102 (e.g., using a fan beam x-ray source).

At block 104, the VCT data may be imported into a database or other memory accessible by a computing system (e.g., computing system 600 of FIG. 6) configured with selected aspects of the present disclosure. At block 106, the imported data may be segmented, e.g., by part if multiple parts are scanned and/or by sub-part. For example, data associated with a 3D volume may be segregated or otherwise distinguished from data representing volumes of other parts. In some embodiments, a connected volume may be selected, extracted, and automatically cropped.

In certain embodiments, as described herein, a background model for the part may be determined. More specifically, in an embodiment, determining the background model may include determining the background model using the scan data. More specifically, still, as shown at block 108, determining the background model may include utilizing an assisted defect recognition (ADR) process. In various embodiments, ADR may include normalizing voxels of a 3D volume to itself, denoising the volume using various techniques, and using techniques such as region growing to detect and/or classify indications of potential defects. At block 110, it may be determined, based on the analysis performed at block 108, whether the part under examination satisfies or passes a predetermined criterion. If the answer is yes (e.g., the part shows no indications of potential defects), then an indication that the part passed may be stored, e.g., in a "pass" database.

If the answer at block 110 is no, on the other hand, then the area may be labeled a "region of interest", and at block 112, further inspection may be initiated so that further review of the part may be completed to determine whether the part truly fails, or whether the automatically perceived indication is minor enough that the part should pass. In at least certain instances, at block 112, metadata relating to various defects, such as wrinkles within or between plies, location, part zone, etc. may be provided to the operator to evaluate along with the scan data.

It will be appreciated that in at least certain exemplary embodiments, the size of the region of interest may be as large or as small as desired. For example, in certain exemplary embodiments, the region of interest may correspond to a single segment (e.g., a single pixel or a single voxel). Alternatively, the region of interest may relate to a larger portion of the part (e.g., at least 1% by volume of the part, such as at least 2%, such as at least 5%, and up to, e.g., 100% (for a relatively small part), such as up to 70%, such as up to 50%, such as up to 30%, such as up to 20%, such as up to 10%).

At block 114, based on data provided at block 112, the method 100 may determine whether the part should pass (e.g., the indication is not of a critical nature or is an artifact of the scan data) or if it should fail using one or more inspection methods, such as method 200 described below. The result of the evaluation at block 114 may be provided to the pass database and/or the fail database.

It will be appreciated, however, that the CT-based inspection method 100 of FIG. 1 is provided by way of example only, and in other exemplary aspects, any other suitable inspection method may be utilized.

Figure 2:
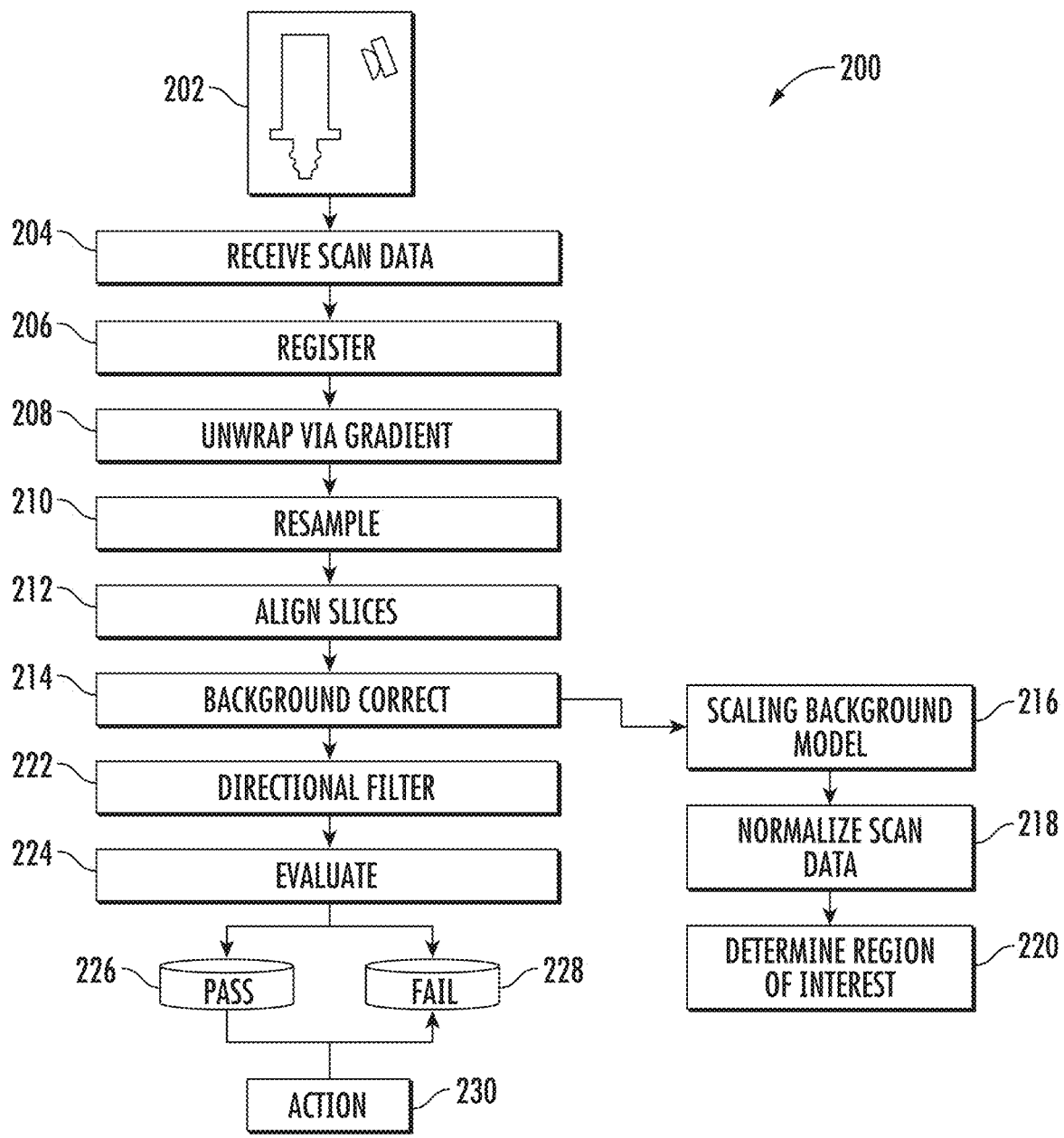
FIG. 2 is a flow chart of a method for detecting a composite architecture of a component part in accordance with an exemplary aspect of the present disclosure.

Referring now to FIG. 2, a flow diagram of a method 200 of producing a computer-generated image of a three-dimensional (3D) component part so as to detect a composite architecture of the component part or of a region of a part (e.g., a region of interest), is provided. The method 200 depicted in FIG. 2 may be incorporated into the method 100 of FIG. 1, for example as the detection at block 108. Additionally, or alternatively, however, the method 200 depicted in FIG. 2 may be utilized with or otherwise incorporated into any other suitable method and/or system for determining information about a part.

As is depicted schematically in FIG. 2, the method 200 includes determining scan data of the part. In particular, at (202), the method 200 includes operating a CT or VCT scanning machine to scan the part (using a CT process or VCT process). For the embodiment shown, the part may be a laminated component part having a plurality of plies or layers. In particular embodiments, the part may be a composite part. The term "composite part" or "composite material" as used herein may be generally defined as a part or material containing a reinforcement, such as fibers or particles, supported in a binder or matrix material. Composite materials include metallic and non-metallic composites. One embodiment for a composite part is made of a unidirectional tape material and an epoxy resin matrix. The composite parts may include composite materials of the non-metallic type made of a material containing a fiber such as a carbonaceous, silica, metal, metal oxide, or ceramic fiber embedded in a resin material such as Epoxy, PMR15, BMI, PEED, etc. A more particular material includes fibers unidirectionally aligned into a tape that is impregnated with a resin, formed into a part shape, and cured via an autoclaving process or press molding to form a lightweight, stiff, relatively homogeneous article having laminates within. However, these are only meant as non-limiting examples.

In certain embodiments the component part may be a composite part for gas turbine engine. In particular, for the embodiment shown, the part is a composite airfoil for a gas turbine engine, such as a fan blade, a compressor rotor blade, a turbine rotor blade, a stator vane, a guide vane, or the like. It will be appreciated, however, that in other exemplary embodiments, aspects of the present disclosure may be utilized with any other suitable part for gas turbine engine, such as one or more of a shroud, a liner, a dome, etc. Further, although described as being utilized with a composite part, in other embodiments, aspects of the present disclosure may be utilized with a part formed of any other suitable material capable of being scanned with a CT scanning machine or VCT scanning machine.

Figure 3:
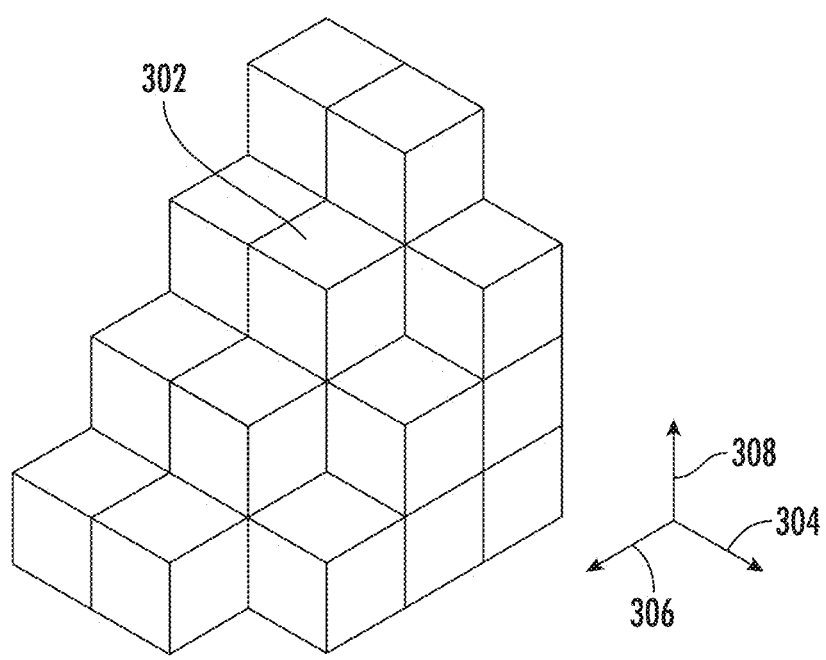
FIG. 3 is an array of voxels in accordance with an exemplary aspect of the present disclosure.
Figure 4C:
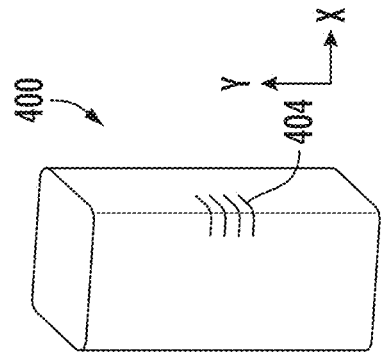
FIGS. 4A-4F illustrate various process steps in a method for detecting a composite architecture of a component part in accordance with an exemplary aspect of the present disclosure.
Figure 4F:
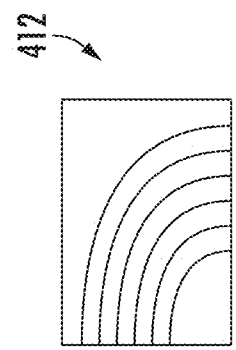
Figure 4B:
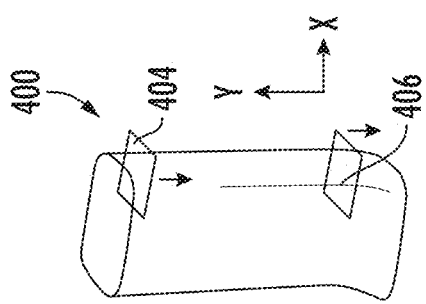

In addition, as part of determining the scan data for the part, the method 200 further includes at (204) receiving the scan data. As will be appreciated, the scan data received at (204) may include data of a plurality of slices that change direction about their normal vector. Each of the slices may include a plurality of sequential segments, which may be a plurality of sequential pixels or voxels. For example, in the case of a method utilizing a two-dimensional CT scanning system, the plurality sequential segments may be a plurality of sequential pixels. By contrast, in the case of a method utilizing a three-dimensional CT or VCT scanning system, the plurality of sequential segments may be a plurality of sequential voxels. For example, referring briefly to FIG. 3, providing a perspective, schematic view of a plurality of sequential voxels 302, it will be appreciated that the plurality of sequential voxels 302 may be a plurality of voxels extending along an x-axis 304, extending along a y-axis 306, extending along a z-axis 308, or extending along any other vector. More particularly, in an embodiment, as shown in FIG. 4A, the scan data may generally include a plurality of slices 402 that form a 3D component part 400.

Referring back specifically to FIG. 2, after receiving the scan data at (204), the method 200 further includes at (206) registering the scan data of the entire volume of the 3D component part. As used herein, registration generally refers to a process of transforming different sets of data into one coordinate system. Accordingly, registration generally refers to an operation where objects in images are aligned such that the different data sets can be compared or integrated from different measurements. For example, in an embodiment, registering the scan data of the 3D component part may include registering the plurality of slices, slice-by-slice, such that each slice in the plurality of slices is registered to an adjacent slice in the plurality of slices.

Referring still to FIG. 2, the method 200 further includes at (208), transforming the scan data of the 3D component part into a plurality of slices arranged in an x-y plane. For example, as shown from FIG. 4A to FIG. 4B, transforming the scan data of the 3D component part 400 may include unwrapping a surface gradient 406 of the 3D component part 400 using a software module of a controller, such as computing system 600 of FIG. 6. In particular, as used herein, unwrapping of the surface gradient 406 generally refers to modifying or distorting the volume of pixel data such that a curved surface is made planar in a desired direction. For example, as shown in FIG. 4A, the surface gradient 406 is a curved surface that bends from the x-y plane to the x-z plane. Thus, as shown in FIG. 4B the surface gradient 406 is unwrapped such that the corresponding volume of pixel data that changes direction results in a surface that remains in the x-y plane.

Referring back to FIG. 2, at (210), the method 200 may include resampling the scan data. In such embodiments, for example, once the slices are aligned (e.g., rotated and translated), the slices no longer line up on the pixel grid as before. Therefore, to generate a new image, the old grid is resampled onto the new grid (as represented by axes 304, 306, 308 in FIG. 3). In other words, if a part and its corresponding voxels is translated or rotated in this space, it no longer lines up with that grid and it must be resampled onto the grid again.

Furthermore, as shown at (212), the method 200 includes aligning the set of slices along an axis in the x-y plane. In particular, as shown in FIG. 4C, once the plurality of slices 402 of the 3D component part 400 are unwrapped in the x-y plane, a plurality of aligned slices 404 can be registered slice-by-slice (e.g., within itself) such that each aligned slice 404 is registered to an adjacent slice.

Referring now back to FIG. 2, the method 200 further includes at (214) background correcting the scan data, e.g., by determining a background model for the part, the scan data, or both. In an embodiment, for example, the background model may be an anticipated value of the scan data of the part. For example, in an embodiment, the background model may be a baseline scan intensity representing density within the part for a particular region of the part.

In certain exemplary embodiments, the background model may be determined at least in part using the scan data received at (204). More specifically, still, determining the background model may include utilizing an assisted defect recognition (ADR) process, as discussed in more detail above. In such a manner, the background model may take into account variations in manufacturing and the like.

However, in other embodiments, determining the background model for the part, the scan data, or both may include utilizing data saved in a memory associated with the part, with the scanner, or both. For example, the background model for the part may be based on an ideal or nearly perfect part.

Further, it will be appreciated that for the exemplary aspect depicted, the method includes at (216) scaling the background model. More specifically, it will be appreciated that determining the background model, when determined using the scan data, in effect generates a model of the part without defects. Thus, as will be appreciated from the discussion below, scaling the background model may include using an average of background data from the background model, e.g., at a particular region of interest. Further, since the average of the background data is based on the background model without defects, the average of the background data may be different from what the true average should be for the part. Accordingly, the method of FIG. 2 may scale the background model at (216) to account for this difference. Scaling the background model at (216) may include applying a transfer function to the background data of the background model, the transfer function applying an energy adjustment to the background data (e.g., multiplying the values of the background data by an energy adjustment factor) such that the background data more closely matches the desired average scan data for the part.

Furthermore, as shown in FIG. 2, the method further includes at (218) normalizing the scan data received at (204) across, e.g., the part or a portion of the part. For example, in an embodiment, normalizing the scan data at (204) may include subtracting out background data of the background model for the part or the portion of the part. The normalized scan data may therefore be indicative of detail within the plurality of plies of the part, independent of certain underlying characteristics of the part, such as the material forming that portion of the part, the manufacturing method for that portion of the part, etc. Such a configuration may enable a consistent analysis of the part, or rather of the normalized scan data of the part, independent of said certain underlying characteristics of the part.

Referring still to FIG. 2, the method may further include at (220) determining one or more regions of interest based on the normalized scan data determined at (218). In particular, at (220) the method 200 may determine portions of the data that appear to include one or more defects in the portions. Utilizing the normalized scan data for such determinations may facilitate a consistent analysis across the part.

Figure 4E:
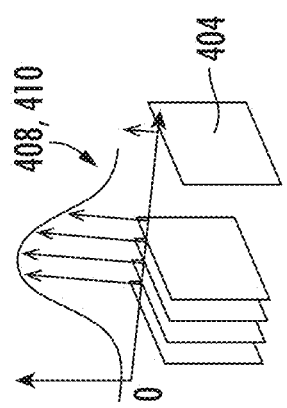
Figure 4A:
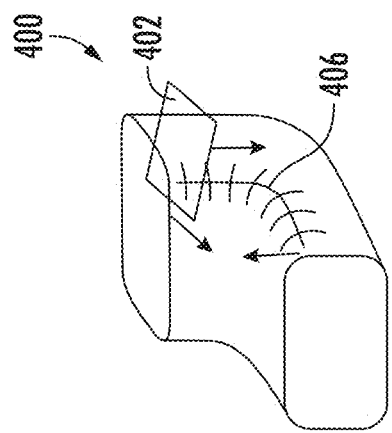
Figure 4D:
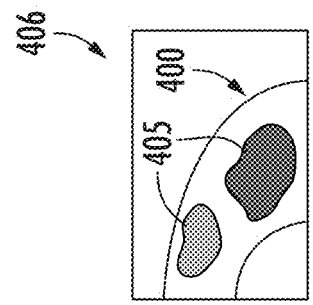

In one example, as shown in FIG. 4D, an example representation of CT nonuniformity due to scatter 405 and/or other artifacts in the component part 400, in which a background model as described herein can be computed and then removed from the acquired volume for enhanced detection of the ply-level information, is illustrated.

Referring back to FIG. 2, the method 200 further includes at (222) applying a directional filter 408, as shown in FIG. 4E, to the set of slices 404 aligned along the axis. For example, in an embodiment, applying the directional filter to the set of slices 404 aligned along the axis may include averaging the set of slices 404 aligned along the axis in a direction parallel to a plane of the plurality of plies. Moreover, in particular embodiments, as shown in FIG. 4E, the directional filter 408 may be a low pass filter 410, such as a Gaussian filter, which generally refers to a filter whose finite impulse response approximates a Gaussian function.

Figure 6:
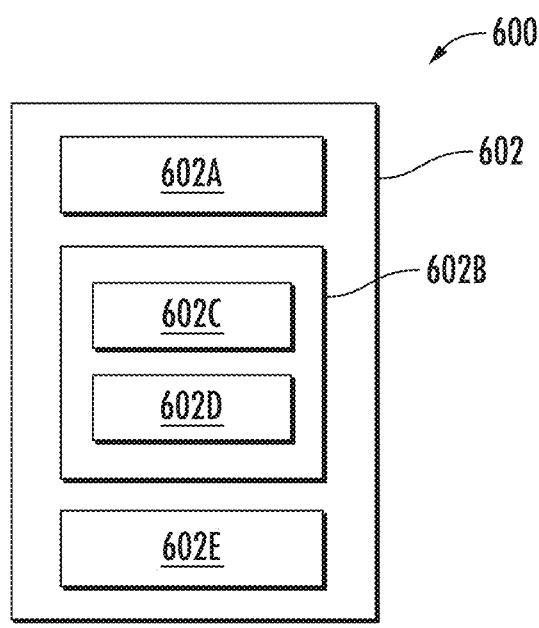
FIG. 6 is a computing system in accordance with an exemplary aspect of the present disclosure.

In certain embodiments, the method 200 may optionally include collapsing or downsampling the set of slices to a reduced number of slices to produce the computer-generated image of the 3D component part. Thus, the output of the computing system 600 of FIG. 6 is an enhanced computer-generated image or volume of the 3D component part. More specifically, as shown in FIG. 4F, the method 200 may include providing an indication of an enhanced computer-generated image 412 of the 3D component part to a user. Thus, as shown, by automating the method 200 of FIG. 6 described herein, the plies (whose cross-section are primarily in a single plane) of the computer-generated image 412 are enhanced, such that defects (e.g., wrinkles) may be easily viewed or detected in images that would otherwise show no to little ply information. Further, the method 200 can be applied to component parts having spatially nonstationary and/or complex features in the plane of the plies, such as ply drops and geometry changes.

Accordingly, and referring back to FIG. 2, the method 100 includes at (224) evaluating the computer-generated image 412 (FIG. 4F) of the 3D component part for defects. For example, in an embodiment, it will be appreciated that the method 200 may provide a visualization of the component part to a user for evaluation. In particular embodiments, as shown in FIG. 4F, the method 200 may include providing an indication of the computer-generated image 412 of the 3D component part to a user. The visualization may be an image of a region of interest, or may be a "pass"/"fail" indication (such as a green light or red light), as indicated at 226 and 228, respectively, in FIG. 2. The results may be provided to a database which is later provided to the user. Any other indicator may additionally or alternatively be provided.

Figure 5B:
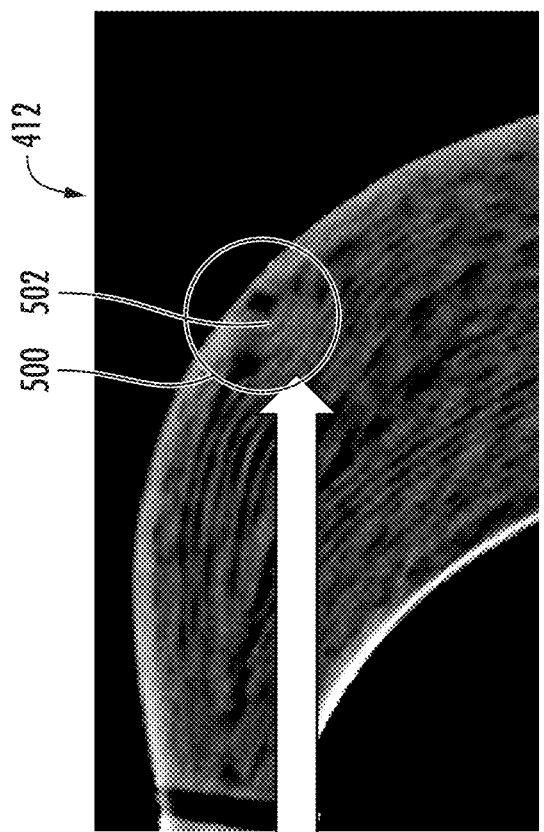
FIG. 5B illustrates a computer-generated image of the 3D component part in accordance with an exemplary aspect of the present disclosure.
Figure 5A:
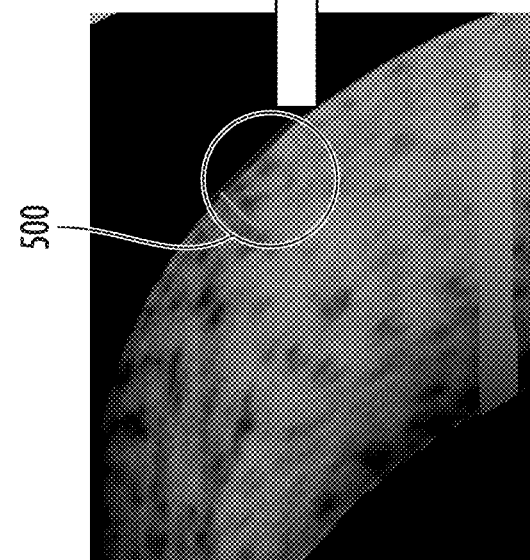
FIG. 5A illustrates a computer-generated image of a 3D component part according to conventional construction.

In particular, as shown in FIGS. 5A and 5B, advantages of the present disclosure are provided. FIG. 5A illustrates a computer-generated image of a 3D component part according to conventional construction, whereas FIG. 5B illustrates the computer-generated image 412 (FIG. 4F) of the 3D component part according to embodiments of the present disclosure. In particular, a region of interest 500 is depicted in each of FIGS. 5A and 5B. In FIG. 5A, however, details within the region of interest 500 are unclear. In contrast, as shown in FIG. 5B, the region of interest 500 clearly depicts a wrinkle 502 in the plies.

Further, still, at 230 of FIG. 2, the method 200 may further initiate an action based on the image, such as when the image indicates damage or defects in the part. The action may be to clear the part for use (i.e., indicate that it has no or minimal defects), or may be to remove the part from use (e.g., sale, distribution, installation, circulation, etc.) in the event the defects are present in the part. Additionally, or alternatively still, the action may be to downgrade the quality of the part based on the evaluation. The actions may be similar to the "Pass"/"Fail" actions described above with respect to FIG. 1.

Referring now to FIG. 6, a schematic view of a computing system 600 in accordance with an exemplary aspect of the present disclosure is provided. The exemplary computing system 600 of FIG. 6 may be configured to receive scan data from the one or more scanners, such as one or more CT/VCT scanners and, e.g., may make decisions based on the received data.

In one or more exemplary embodiments, the computing system 600 depicted in FIG. 6 may be a stand-alone computing system 600 or alternatively may be integrated into one or more other computing systems.

Referring particularly to the operation of the computing system 600, in at least certain embodiments, the computing system 600 can include one or more computing devices 602. The computing device(s) 602 can include one or more processors 602A and one or more memory devices 602B. The processor(s) 602A can include any suitable processing device, such as a microprocessor, microcontroller, integrated circuit, logic device, and/or other suitable processing device. The memory device(s) 602B can include one or more computer-readable media, including, but not limited to, non-transitory computer-readable media, RAM, ROM, hard drives, flash drives, and/or other memory devices.

The memory device(s) 602B can store information accessible by the processor(s) 602A, including computer-readable instructions 602C that can be executed by the processor(s) 602A. The instructions 602C can be any set of instructions that when executed by the processor(s) 602A, cause the processor(s) 602A to perform operations. In some embodiments, the instructions 602C can be executed by the processor(s) 602A to cause the processor(s) 602A to perform operations, such as any of the operations and functions for which the computing system 600 and/or the computing device(s) 602 are configured as described herein, and/or any other operations or functions of the computing device(s) 602. The instructions 602C can be software written in any suitable programming language or can be implemented in hardware. Additionally, and/or alternatively, the instructions 602C can be executed in logically and/or virtually separate threads on the processor(s) 602A. The memory device(s) 602B can further store data 602D that can be accessed by the processor(s) 602A. For example, the data 602D can include data indicative of power flows, data indicative of engine/aircraft operating conditions, and/or any other data and/or information described herein.

The computing device(s) 602 can also include a network interface 602E used to communicate, for example, with the other components. The network interface 602E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects are provided by the subject matter of the following clauses:

A method of producing a computer-generated image of a three-dimensional (3D) component part, the method comprising: receiving, via a controller, scan data of the 3D component part, the scan data comprising a plurality of slices that change direction about a normal vector; registering, via the controller, the scan data of the 3D component part; transforming, via the controller, the scan data of the 3D component part into a set of slices arranged in an x-y plane; aligning, via the controller, the set of slices arranged in the x-y plane along an axis in the x-y plane; adjusting, via the controller, the set of slices aligned along the axis using a background model for the 3D component part, the scan data, or both; applying, via the controller, a directional filter to the set of slices aligned along the axis; and generating the computer-generated image of the 3D component part using the filtered set of slices aligned along the axis.

The method of any preceding clause, wherein registering the scan data of the 3D component part further comprises: registering the set of slices aligned along the axis, slice-by-slice, such that each slice in the set of slices aligned along the axis, is registered to an adjacent slice in the set of slices aligned along the axis.

The method of any preceding clause, wherein transforming the scan data of the 3D component part into the set of slices arranged in the x-y plane further comprises: unwrapping a surface gradient of the 3D component part using a software module of the controller.

The method of any preceding clause, wherein the 3D component part comprises a laminated component part comprising a plurality of plies.

The method of any preceding clause, wherein applying the directional filter to the set of slices aligned along the axis further comprises: averaging the set of slices aligned along the axis in a direction parallel to a plane of the plurality of plies.

The method of any preceding clause, wherein the directional filter comprises a low pass filter.

The method of any preceding clause, further comprising collapsing, via the controller, the set of slices aligned along the axis to produce the computer-generated image of the 3D component part.

The method of any preceding clause, further comprising providing an indication of the computer-generated image of the 3D component part to a user.

The method of any preceding clause, further comprising evaluating the indication of the computer-generated image of the 3D component part for defects.

The method of any preceding clause, further comprising scanning the 3D component part using a computed tomography process, wherein the computed tomography process is a volumetric computed tomography process.

The method of any preceding clause, wherein the 3D component part is a part for a gas turbine engine.

A system for producing a computer-generated image of a three-dimensional (3D) component part, the system comprising: one or more processors; and memory operably coupled to the one or more processors, the memory containing instructions that, in response to execution of the instructions by the one or more processors, cause the one or more processors to perform a plurality of operations, the plurality of operations comprising: receiving scan data of the 3D component part, the scan data comprising a plurality of slices that change direction about a normal vector; registering the scan data of the 3D component part; transforming the scan data of the 3D component part into set of slices arranged in an x-y plane; aligning the set of slices arranged in the x-y plane along an axis in the x-y plane; adjusting the set of slices aligned along the axis using a background model for the 3D component part, the scan data, or both; applying a directional filter to the set of slices aligned along the axis; and generating the computer-generated image of the 3D component part using the filtered set of slices aligned along the axis.

The system of any preceding clause, wherein registering the scan data of the 3D component part further comprises: registering the set of slices aligned along the axis, slice-by-slice, such that each slice in the set of slices aligned along the axis, is registered to an adjacent slice in the set of slices aligned along the axis.

The system of any preceding clause, wherein transforming the scan data of the 3D component part into the set of slices arranged in the x-y plane further comprises: unwrapping a surface gradient of the 3D component part using a software module of the one or more processors.

The system of any preceding clause wherein the 3D component part comprises a laminated part comprising a plurality of plies.

The system of any preceding clause, wherein applying the directional filter to the set of slices aligned along the axis further comprises: averaging the set of slices aligned along the axis in a direction parallel to a plane of the plurality of plies.

The system of any preceding clause, wherein the directional filter comprises a low pass filter.

The system of any preceding clause, wherein the plurality of operations further comprise collapsing the set of slices to produce the computer-generated image of the 3D component part.

The system of any preceding clause, wherein the plurality of operations further comprise providing an indication of the computer-generated image of the 3D component part to a user.

The system of any preceding clause, wherein the plurality of operations further comprise scanning the 3D component part using a computed tomography process, wherein the computed tomography process is a volumetric computed tomography process.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A method of producing a computer-generated image of a three-dimensional (3D) component part, the method comprising:
   receiving, via a controller, scan data of the 3D component part, the scan data comprising a plurality of slices that change direction about a normal vector;
   registering, via the controller, the scan data of the 3D component part;
   transforming, via the controller, the scan data of the 3D component part into a set of slices arranged in an x-y plane;
   aligning, via the controller, the set of slices arranged in the x-y plane along an axis in the x-y plane;
   adjusting, via the controller, the set of slices aligned along the axis using a background model for the 3D component part, the scan data, or both;
   applying, via the controller, a directional filter to the set of slices aligned along the axis; and
   generating the computer-generated image of the 3D component part using the filtered set of slices aligned along the axis.

2. The method of claim 1, wherein registering the scan data of the 3D component part further comprises:
   registering the set of slices aligned along the axis, slice-by-slice, such that each slice in the set of slices aligned along the axis is registered to an adjacent slice in the set of slices aligned along the axis.

3. The method of claim 1, wherein transforming the scan data of the 3D component part into the set of slices arranged in the x-y plane further comprises:
   unwrapping a surface gradient of the 3D component part using a software module of the controller.

4. The method of claim 1, wherein the 3D component part comprises a laminated component part comprising a plurality of plies.

5. The method of claim 4, wherein applying the directional filter to the set of slices aligned along the axis further comprises:
   averaging the set of slices aligned along the axis in a direction parallel to a plane of the plurality of plies.

6. The method of claim 1, wherein the directional filter comprises a low pass filter.

7. The method of claim 1, further comprising collapsing, via the controller, the set of slices aligned along the axis to produce the computer-generated image of the 3D component part.

8. The method of claim 1, further comprising providing an indication of the computer-generated image of the 3D component part to a user.

9. The method of claim 8, further comprising evaluating the indication of the computer-generated image of the 3D component part for defects.

10. The method of claim 1, further comprising scanning the 3D component part using a computed tomography process, wherein the computed tomography process is a volumetric computed tomography process.

11. The method of claim 1, wherein the 3D component part is a part for a gas turbine engine.

12. A system for producing a computer-generated image of a three-dimensional (3D) component part, the system comprising:
   one or more processors; and
   memory operably coupled to the one or more processors, the memory containing instructions that, in response to execution of the instructions by the one or more processors, cause the one or more processors to perform a plurality of operations, the plurality of operations comprising:
      receiving scan data of the 3D component part, the scan data comprising a plurality of slices that change direction about a normal vector;
      registering the scan data of the 3D component part;
      transforming the scan data of the 3D component part into set of slices arranged in an x-y plane;
      aligning the set of slices arranged in the x-y plane along an axis in the x-y plane;
      adjusting the set of slices aligned along the axis using a background model for the 3D component part, the scan data, or both;
      applying a directional filter to the set of slices aligned along the axis; and
      generating the computer-generated image of the 3D component part using the filtered set of slices aligned along the axis.

13. The system of claim 12, wherein registering the scan data of the 3D component part further comprises:
   registering the set of slices aligned along the axis, slice-by-slice, such that each slice in the set of slices aligned along the axis is registered to an adjacent slice in the set of slices aligned along the axis.

14. The system of claim 12, wherein transforming the scan data of the 3D component part into the set of slices arranged in the x-y plane further comprises:
   unwrapping a surface gradient of the 3D component part using a software module of the one or more processors.

15. The system of claim 12, wherein the 3D component part comprises a laminated part comprising a plurality of plies.

16. The system of claim 15, wherein applying the directional filter to the set of slices aligned along the axis further comprises:
   averaging the set of slices aligned along the axis in a direction parallel to a plane of the plurality of plies.

17. The system of claim 12, wherein the directional filter comprises a low pass filter.

18. The system of claim 12, wherein the plurality of operations further comprise collapsing the set of slices to produce the computer-generated image of the 3D component part.

19. The system of claim 18, wherein the plurality of operations further comprise providing an indication of the computer-generated image of the 3D component part to a user.

20. The system of claim 12, wherein the plurality of operations further comprise scanning the 3D component part using a computed tomography process, wherein the computed tomography process is a volumetric computed tomography process.

* * * * *